United States Patent
Kang et al.

(10) Patent No.: US 12,319,260 B2
(45) Date of Patent: Jun. 3, 2025

(54) PRESSURE SENSING SYSTEM OF PNEUMATIC SPRING BRAKE CHAMBER FOR A VEHICLE

(71) Applicant: MIRAEVC CO., LTD., Jeollabuk-do (KR)

(72) Inventors: Byungyong Kang, Jeollabuk-do (KR); Soonsik Myung, Jeollabuk-do (KR); Seunghoon Lee, Jeollabuk-do (KR)

(73) Assignee: MIRAEVC CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/795,799

(22) PCT Filed: Sep. 7, 2021

(86) PCT No.: PCT/KR2021/012086
§ 371 (c)(1),
(2) Date: Jul. 27, 2022

(87) PCT Pub. No.: WO2022/231073
PCT Pub. Date: Nov. 3, 2022

(65) Prior Publication Data
US 2024/0182006 A1    Jun. 6, 2024

(30) Foreign Application Priority Data
Apr. 26, 2021   (KR) .................. 10-2021-0053441

(51) Int. Cl.
*B60T 8/171*    (2006.01)
*B60T 17/22*    (2006.01)

(52) U.S. Cl.
CPC .............. *B60T 8/171* (2013.01); *B60T 17/22* (2013.01); *B60Y 2400/306* (2013.01)

(58) Field of Classification Search
CPC . B60T 8/171; B60T 17/22; B60T 8/18; B60T 8/1825; B60T 13/38; B60T 17/083; B60T 17/088; B60Y 2400/306
See application file for complete search history.

(56) References Cited

U.S. PATENT DOCUMENTS 6,255,941 B1 *  7/2001  Osterman ............. F16D 66/028
                                                 340/479
6,888,451 B1 *  5/2005  Plantan .................. F16D 65/28
                                                 188/107

(Continued)

FOREIGN PATENT DOCUMENTS

DE          197 29 158 C1   10/1998
KR    10-2004-0049407 A      6/2004

(Continued)

OTHER PUBLICATIONS

Korean Patent No. KR 20180005839 to Lee published on Jan. 17, 2018.*

(Continued)

*Primary Examiner* — Pamela Rodriguez
(74) *Attorney, Agent, or Firm* — The PL Law Group, PLLC (57) ABSTRACT

A pressure sensing system of a pneumatic spring brake chamber for a vehicle according to an embodiment of the present disclosure includes a plurality of pressure sensors configured to measure pressure in a pressure chamber formed between a piston and an adapter housing and a service chamber formed between the adapter housing and a diaphragm, a control box electrically connected to the plurality of pressure sensors, and an indicator electrically coupled to the control box, wherein the control box is wired for power supply and output voltage to the plurality of pressure sensors, and the indicator located in a vehicle driver's seat is configured to generate an alarm about an (Continued)

abnormal situation of the pneumatic spring brake chamber for a vehicle based on pressure measurement values in the pressure chamber and the service chamber through the plurality of pressure sensors.

2 Claims, 5 Drawing Sheets

(56) References Cited

U.S. PATENT DOCUMENTS

| | | |
|---|---|---|
| 2010/0174464 A1 | 7/2010 | Teyssier |
| 2014/0224598 A1* | 8/2014 | Park ............... B60T 17/083 188/106 F |
| 2017/0158183 A1 | 6/2017 | Hecker et al. |
| 2018/0009428 A1* | 1/2018 | Lee ............... B60T 17/088 |

FOREIGN PATENT DOCUMENTS

| | | |
|---|---|---|
| KR | 10-2004-0054029 A | 6/2004 |
| KR | 10-1567709 B1 | 11/2015 |

OTHER PUBLICATIONS

Translation of Korean Patent No. KR 20040049407 to Yang obtained from website: https://worldwide.espacenet.com on Sep. 30, 24.*

* cited by examiner

PRESSURE SENSING SYSTEM OF PNEUMATIC SPRING BRAKE CHAMBER FOR A VEHICLE

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/012086 filed on Sep. 7, 2021, which claims priority to the benefit of Korean Patent Application No. 10-2021-0053441 filed in the Korean Intellectual Property Office on Apr. 26, 2021, the entire contents of which are incorporated herein by reference.

BACKGROUND

1. Technical Field

The present disclosure relates to a pressure sensing system of a pneumatic spring brake chamber for a vehicle, and more particularly, to a pressure sensing system of a pneumatic spring brake chamber for a vehicle which may monitor a pressure change state in real time by connecting a plurality of pressure sensors for measuring pressure in a pressure chamber and a service chamber to an indicator of a driver's seat.

2. Background Art

Large vehicles such as buses, trucks, trailers, and other heavy machinery use a brake chamber for a vehicle that performs delicate and fast braking operation while high-speed driving or parking and has good braking performance.

With regard to a vehicle brake chamber, Korean Patent No. 10-1567709 discloses a brake actuator. The vehicle brake chamber includes a head housing, an adapter housing, and a bottom housing of a hollow shape in a sequential order from the top. A piston is located between the head housing and the adapter housing, and a hollow actuator rod is coupled to the piston and placed through a through-hole of the adapter housing. A diaphragm is located between the adapter housing and the bottom housing. Also, a pressure plate supporting the diaphragm and a push rod supporting the pressure plate are provided, and the push rod is placed through a through-hole formed in the bottom housing.

Through this structure, a space formed between the head housing and the piston is a spring chamber, and a spring is located in the space. A space provided between the piston and the adapter housing is a pressure chamber. A space formed between the adapter housing and the diaphragm is a service chamber, and a push rod chamber is formed between the diaphragm and the bottom housing.

As such, the vehicle brake chamber includes the spring chamber, the pressure chamber, the service chamber, and the push rod chamber from top to bottom, and when the pressure plate vertically moves according to adjustment of an elastic force of the spring and air pressure in the service chamber, the push rod connected through a lower end of the bottom housing is moved, thereby allowing a brake to operate while a vehicle is driving or parked.

In this case, the push rod vertically moves to allow the brake to operate, and when there is a problem in a braking state of the brake, the stroke of the push rod is changed. However, because the brake actuator of Korean Patent No. 10-1567709 does not disclosure an element capable of detecting abnormality or a slight change in the stroke of the push rod, it is difficult to repair the push rod chamber in advance.

SUMMARY

The present disclosure relates to a pressure sensing system of a pneumatic spring brake chamber for a vehicle which may monitor a pressure change state in real time by connecting a plurality of pressure sensors for measuring pressure in a pressure chamber and a service chamber to an indicator of a driver's seat.

A pressure sensing system of a pneumatic spring brake chamber for a vehicle according to the present disclosure includes: a head housing, a bottom housing, an adapter housing located between the head housing and the bottom housing, a piston located between the head housing and the adapter housing, and a diaphragm fixed between the adapter housing and the bottom housing to divide a space between the adapter housing and the bottom housing; a push rod supporting a bottom surface of the diaphragm and moving along a push rod through-hole formed in a bottom surface of the bottom housing; and a push rod guide fixed to the bottom surface of the bottom housing while sealing between the push rod and the push rod through-hole, wherein the pressure sensing system further includes a plurality of pressure sensors configured to measure pressure in a pressure chamber formed between the piston and the adapter housing and a service chamber formed between the adapter housing and the diaphragm, a control box electrically connected to the plurality of pressure sensors, and an indicator electrically coupled to the control box, wherein the control box is wired for power supply and output voltage to the plurality of pressure sensors, and the indicator located in a vehicle driver's seat is configured to generate an alarm about an abnormal situation of the pneumatic spring brake chamber for a vehicle based on pressure measurement values in the pressure chamber and the service chamber through the plurality of pressure sensors.

Each of the plurality of pressure sensors may include a connector detachably coupled to an outer side of the adapter housing and assembled at a port formed in the service chamber or the pressure chamber, a pressure detection sensor coupled in a communicable state to an internal passage of the connector, and a cover coupled to an outer end in a communication state with the internal passage of the connector.

A pressure sensing system of a pneumatic spring brake chamber for a vehicle according to the present disclosure may monitor a pressure change state in real time in a state where a plurality of pressure sensors for measuring pressure in a pressure chamber located between a piston and an adapter housing and a service chamber located between the adapter housing and a diaphragm are connected to an indicator of a driver's seat.

DETAILED DESCRIPTION

Hereinafter, embodiments of the present disclosure will be described in more detail with reference to the drawings. The present disclosure may, however, be embodied in many different forms and should not be construed as being limited to the embodiments set forth herein; rather, these embodiments are provided so that this disclosure will be thorough and complete, and will fully convey the concept of the present disclosure to one of ordinary skill in the art. In the drawings, the same reference numerals denote the same elements.

In adding reference numerals to elements of each drawing, it should be noted that the same elements are denoted by the same reference numerals as much as possible even when they are shown on different drawings. Also, in describing the present disclosure, detailed descriptions of related well-known functions or configurations that may blur the points of the present disclosure are omitted.

Figure 1:
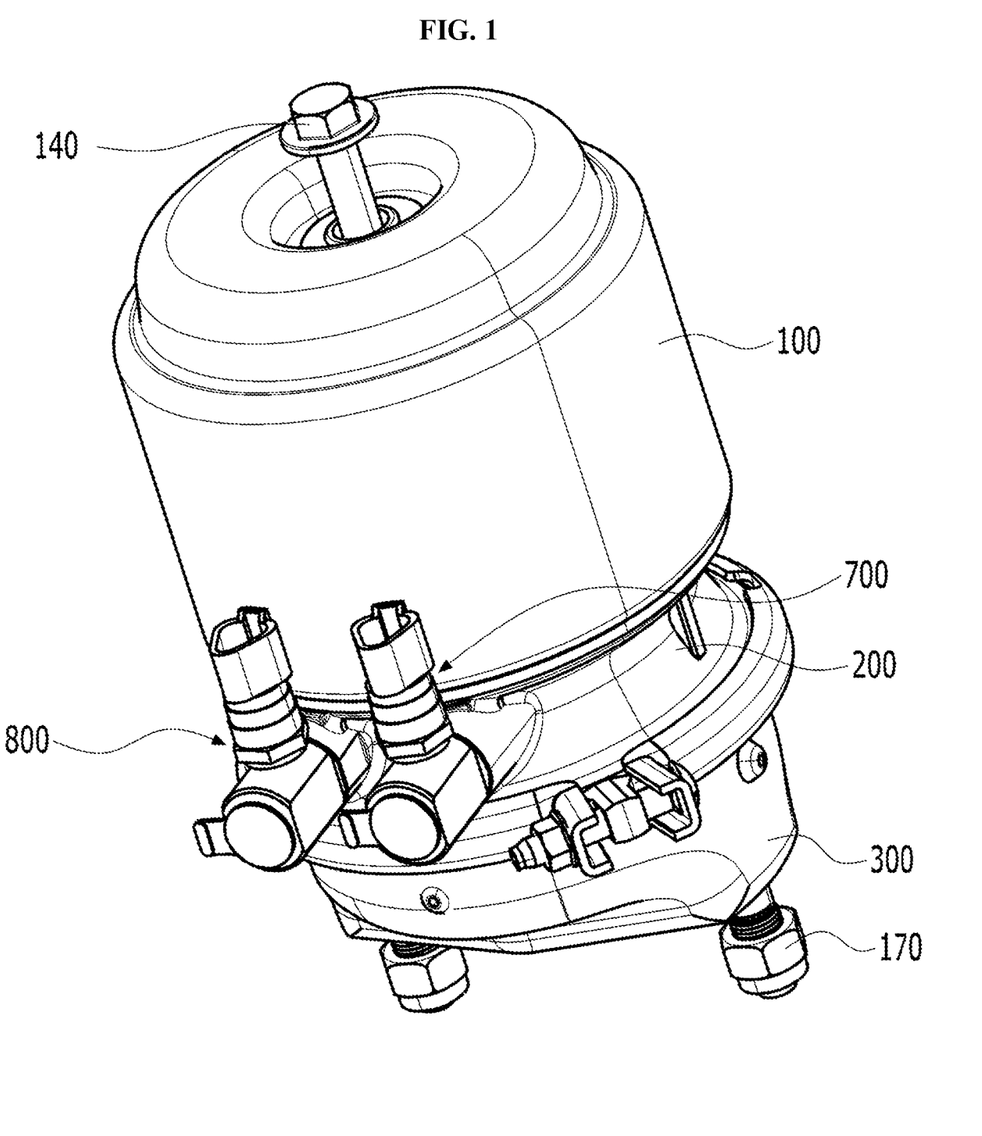
FIG. 1 is a view illustrating a configuration of a pneumatic spring brake chamber for a vehicle according to an embodiment of the present disclosure.
Figure 2:
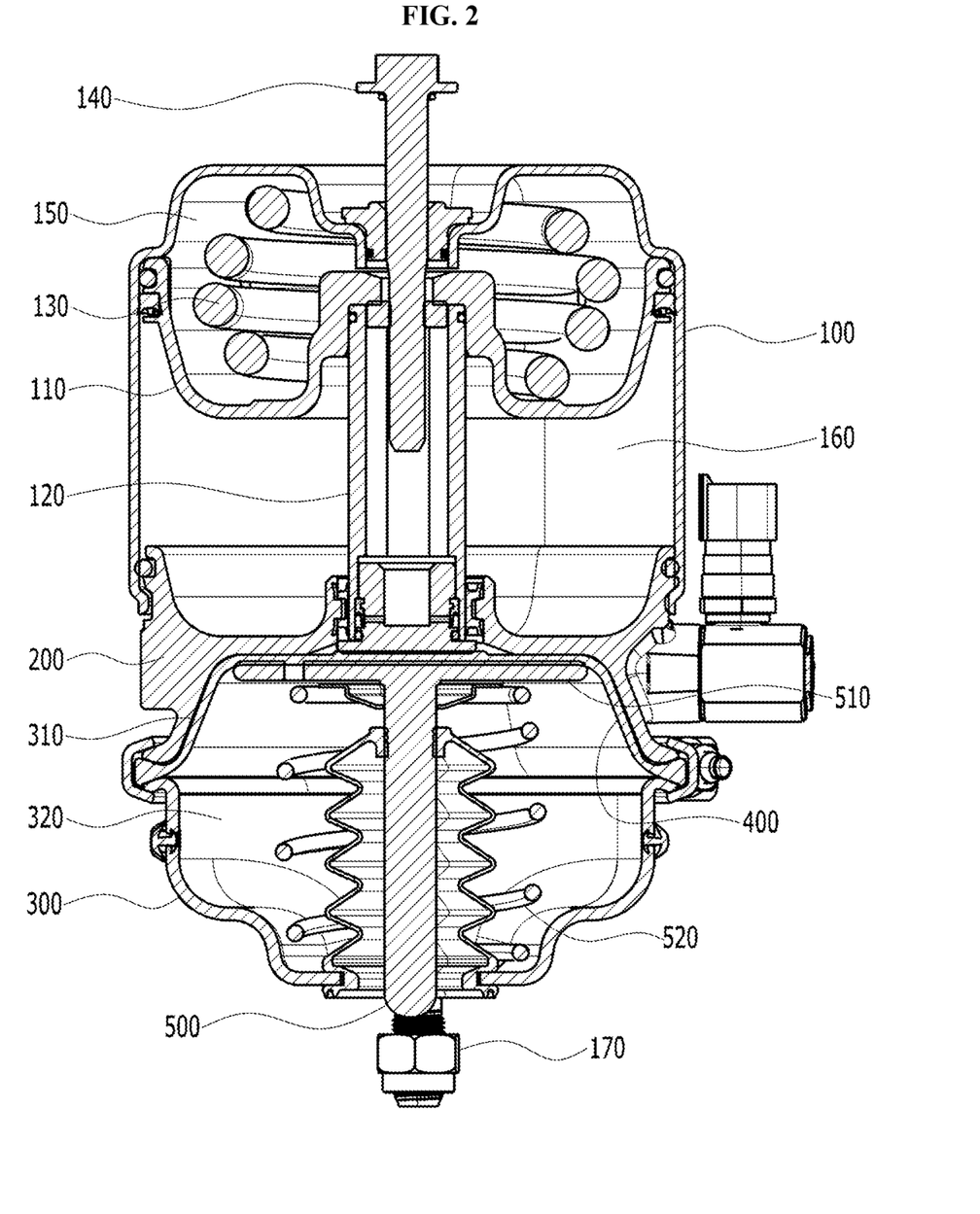
FIG. 2 is a cross-sectional view illustrating the pneumatic spring brake chamber for a vehicle of FIG. 1.

First, a pneumatic spring brake chamber for a vehicle includes a head housing 100, an adapter housing 200, and a bottom housing 300 of a hollow shape in a sequential order from the top, and a piston 110 is located between the head housing 100 and the adapter housing 200, and a diaphragm 400 is located between the adapter housing 200 and the bottom housing 300.

An actuator rod 120 has a through-hole passing through the adapter housing 200 in a downward direction of a piston through-hole formed in the piston 110, and a rod valve is located at an end of the actuator rod 120. The rod valve brings a spring chamber 150 and a service chamber 310 into communication with each other, thereby allowing air to flow. Although the piston 110 and the actuator rod 120 are separately formed in the present embodiment, the piston 110 and the actuator rod 120 may be integrally formed with each other.

The pneumatic spring brake chamber for a vehicle has a flow of air between the spring chamber 150 and the service chamber 310 through the hollow actuator rod 120 located between the spring chamber 150 and the service chamber 310 and the actuator rod valve coupled to a lower end of the actuator rod 120.

In the pneumatic spring brake chamber for a vehicle, the spring chamber 150 is formed between the head housing 100 and the piston 110, and a pressure chamber 160 is formed between the piston 110 and the adapter housing 200. Also, the service chamber 310 is formed between the adapter housing 200 and the diaphragm 400, and a push rod chamber 320 is formed between the diaphragm 400 and the bottom housing 300.

A compressive spring 130 located in the spring chamber 150 is a coil spring, and an outer diameter of a coil decreases from the center of the coil toward both ends. In this case, one end of the compressive spring 130 is in contact with and supported by the piston 110, and the other end of the compressive spring 130 is in contact with and supported by a curved portion of the head housing 100.

The head housing 100 has the curved portion along an inner side of the head housing 100 at an upper end of the head housing 100, and the curved portion prevents the compressive spring 130 from moving at an upper position, so that the compressive spring 130 is compressed, always maintaining a constant center axis.

The piston 110 is in close contact with the inside of the head housing 100, to separate an inner space of the head housing 100 into the spring chamber 150 and the pressure chamber 160. The hollow actuator rod 120 is located in one direction along the piston through-hole. Accordingly, one end of the actuator rod 120 may be connected to and supported by the piston 110, and the other end of the actuator rod 120 may pass through the through-hole of the adapter housing 200 and may be supported by the diaphragm 400.

A lip seal 122 is located at a region where an outer circumferential surface of the actuator rod 120 and an inner circumferential surface of the adapter housing 200 contact each other, to prevent a fluid from leaking out. That is, the lip seal 122 is assembled in the through-hole formed at the center of the adapter housing 200, and the actuator rod 120 operates through the lip seal 122. The lip seal 122 performs a sealing function to block the movement of air pressure between the pressure chamber and the service chamber.

In the actuator rod 120, a caging bolt 140 is located along the hollow of the adaptor housing 200 with one end fixed to a head housing through-hole of the head housing 100 and a caging nut is located with the other end screwed to the caging bolt 140.

The caging bolt 140 for forcibly compressing a power spring is used for mounting or to forcibly unpark a vehicle with no air pressure. A state in the drawing is a forcibly compressed and fixed state, and to normally operate after mounting in the vehicle, the caging bolt should be closely tightened to a chamber head so as not to protrude.

A mounting bolting structure 170 functions to fix the pneumatic spring brake chamber for a vehicle to a bracket or a caliper of the vehicle. The mounting bolting structure 170 includes a mounting bolt and a mounting nut.

The adapter housing 200 is located between the head housing 100 and the bottom housing 300, to interconnect the head housing 100 and the bottom housing 300. The adapter housing 200 includes the through-hole at the center, and the actuator rod 120 is in contact with and supported by the diaphragm 400 through the through-hole. A valve structure for allowing air to flow in may be provided on a side surface of the adapter housing 200, so that air flows in when a parking brake operates at a driving stage of the vehicle.

The diaphragm 400 is located in the bottom housing 300 and is in contact with and supported by a push rod plate 510, to divide the bottom housing 300 into the service chamber 310 and the push rod chamber 320. In this case, the push rod plate 510 is supported by a push rod 500, and transmits a movement of the diaphragm 400 due to air pressure to the push rod 500. A push rod spring 520 is located between the push rod plate 510 and the bottom housing 300 along an axial direction of the push rod 500, and is compressed or restored according to the movement of the push rod plate 510.

Figure 5:
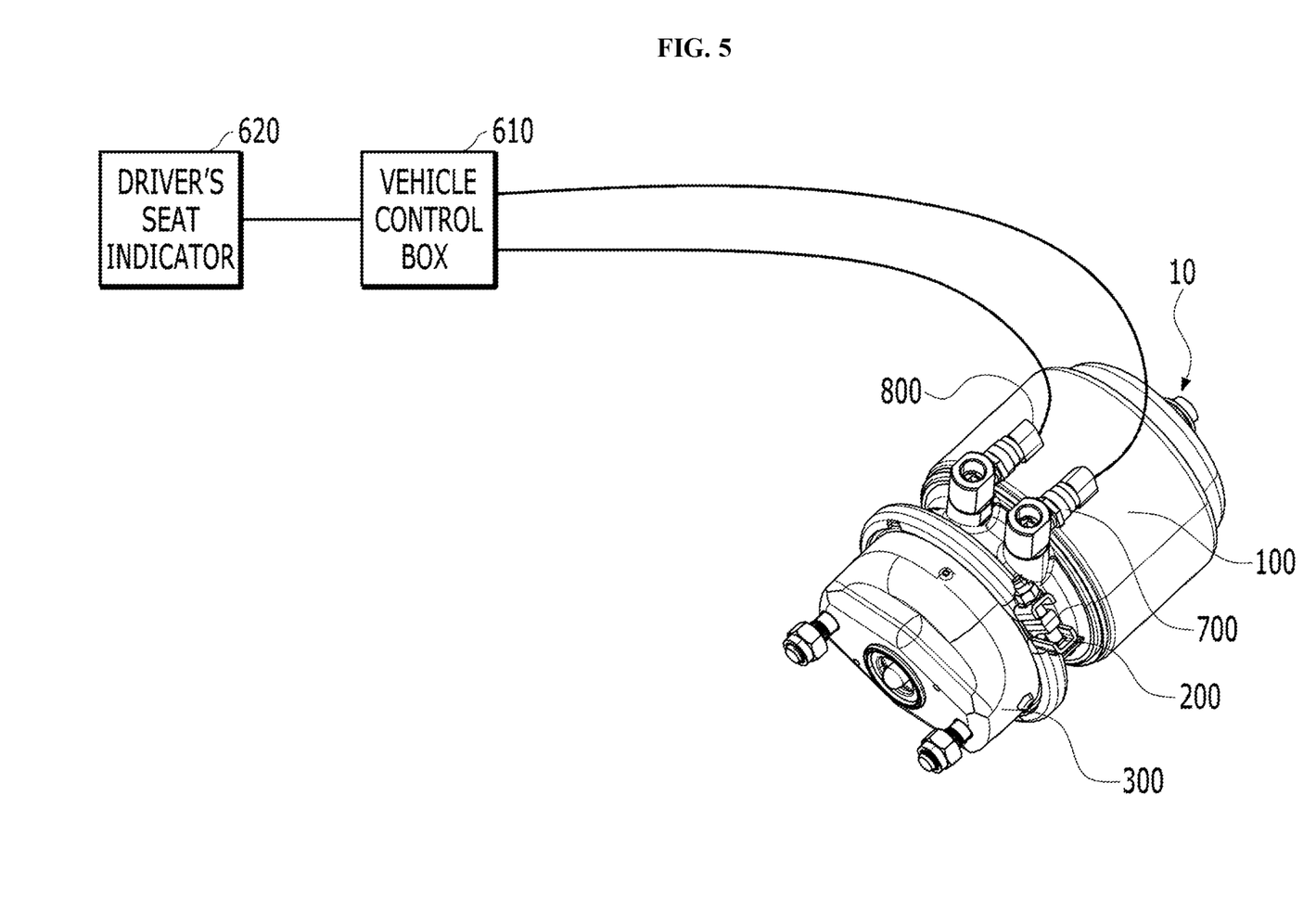
FIG. 5 illustrates a process of monitoring a pressure change state in real time in a state where a plurality of pressure sensors are connected to an indicator of a driver's seat.

The pressure sensing system of the pneumatic spring brake chamber for a vehicle according to an embodiment of the present disclosure further includes a plurality of pressure sensors for measuring pressure in the pressure chamber and the service chamber, a control box 610 coupled to the pressure sensors in a wired or wireless electrical communication method, and an indicator 620 electrically coupled to the control box.

The control box 610 is wired for power supply and output voltage to the pressure sensors respectively located in the pressure chamber and the service chamber. A wireless communication method may also be used between the pressure sensor and the control box in addition to wired connection according to a wired method.

The indicator 620 located in a driver's seat generates an alarm about an abnormal situation of the chamber through a smartphone or the like based on pressure measurement values in the pressure chamber and the service chamber.

Figure 3:
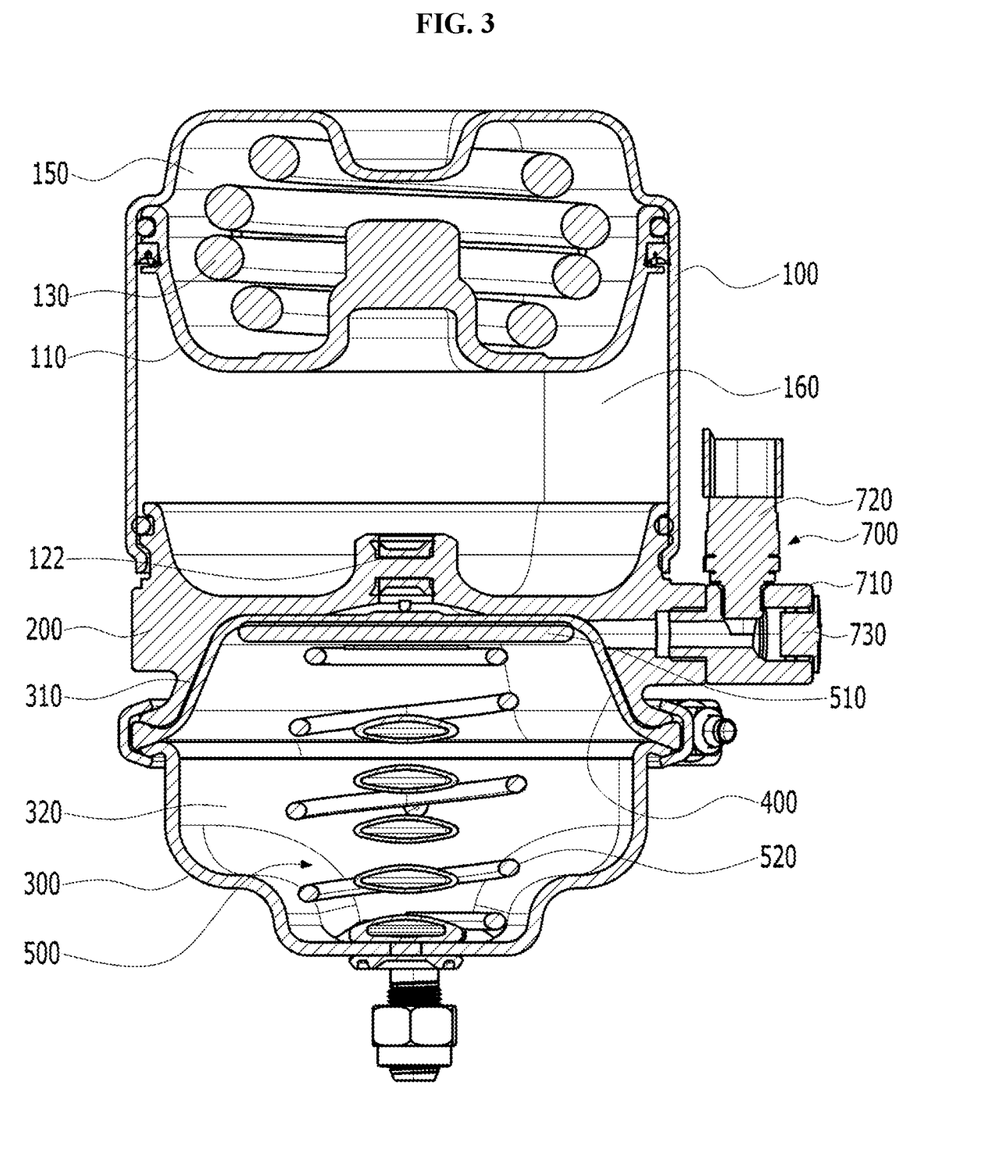
FIG. 3 is a view illustrating coupling of a pressure sensor connected to a service chamber in the pneumatic spring brake chamber for a vehicle of FIG. 1.
Figure 4:
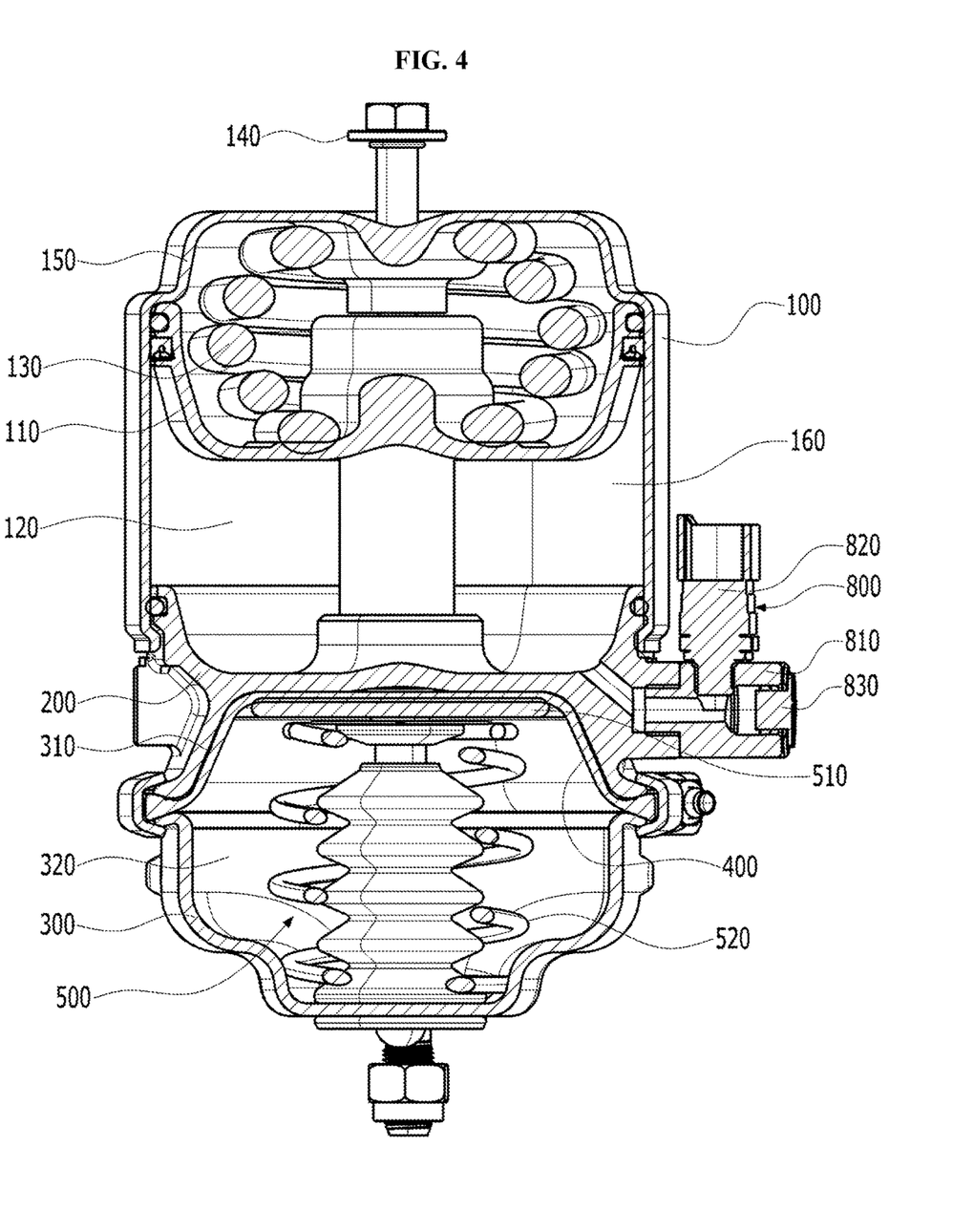
FIG. 4 is a view illustrating coupling of a pressure sensor connected to a pressure chamber in the pneumatic spring brake chamber for a vehicle of FIG. 1.

The plurality of pressure sensors include a first pressure sensing module 700 communicating with the service chamber 310 and a second pressure sensing module 800 communicating with the pressure chamber 160. The first pressure sensing module 700 and the second pressure sensing module 800 may be formed on an outer side of the adapter housing 200 to be parallel to each other and face the same direction.

Referring to FIG. 3, the first pressure sensing module 700 includes a first connector 710 detachably coupled to an outer side of the adapter housing 200 and communicating with the service chamber 310, a first pressure detection sensor 720 coupled to an internal passage of the first connector 710 in a communication state, and a first cover 730 coupled to an outer end in a communication state with the internal passage of the first connector 710. The first connector 710 is assembled at a first port formed from the adapter housing 200 to the service chamber 310, and the first pressure detection sensor 720 is screwed to the first connector 710.

Referring to FIG. 4, the second pressure sensing module 800 includes a second connector 810 detachably coupled to an outer side of the adapter housing 200 and communicating with the pressure chamber 160, a second pressure detection sensor 820 coupled to an internal passage of the second connector 810 in a communication state, and a second cover 830 coupled to an outer end in a communication state with the internal passage of the second connector 810. The second connector 810 is assembled at a second port formed from the adapter housing 200 to the pressure chamber 160, and the second pressure detection sensor 820 is screwed to the second connector 810.

In another embodiment, the first and second pressure detection sensors 720, 820 of the first and second pressure sensing modules 700, 800 may be directly connected to the adapter housing 200 without the first and second connectors 710, 810.

When external air pressure fills the service chamber, the diaphragm 400 (membrane) is expanded, pressure is applied to the push rod plate 510, and the push rod 500 moves downward.

When external air pressure fills the pressure chamber, the air pressure is applied to the entire area of the piston 110 and an edge seal of the piston 110, and thus the compressive spring 130 that is a power spring is compressed.

The control box 610 determines whether there is abnormality in the spring pressure chamber and the service chamber by using a pressure change from a pressure signal sensed by the plurality of pressure sensors.

In this case, when a sensed stroke value of the push rod 500 is greater or less than a preset reference value, the control box 610 may determine that there is abnormality in the pneumatic spring brake chamber 10 and may request to check the spring brake chamber 10.

When it is determined that there is abnormality in the stroke of the push rod 500, the control box 610 may transmit a state of the spring brake chamber to an electronic control unit (ECU) of the vehicle connected to the control box 610, and the ECU may request to check the spring brake chamber 10 through a display unit or a voice device of the vehicle.

In this case, the control box 610 may be connected to the ECU through a wireless communication module. That is, when it is necessary to check the spring brake chamber, the control box 610 may transmit a request to check the spring brake chamber to the ECU of the vehicle by using the wireless communication module, and the ECU may notify a checking signal through the display unit or the voice device provided in the vehicle.

As such, because the plurality of pressure sensors and the control box 610 interoperate with each other to check a normal operation of the brake by checking pressure states of the pressure chamber and the service chamber in real time, it may be detected whether there is a change in air pressure of at least one of the spring chamber 150, the pressure chamber 160, the service chamber 310, and the push rod chamber 320 and there is a change in the movement of the push rod 500 due to damage to the diaphragm 400 or the like. Accordingly, because a state of the brake may be determined through a process of checking pressure states of the pressure chamber and the service chamber through the plurality of pressure sensors and monitoring a change in a stroke value of the push rod 500 linked to the states of the pressure chamber and the service chamber, an accident due to brake may be prevented in advance.

A process of determining whether there is abnormality in the chamber based on a change in pressure checked through the plurality of pressure sensors is as follows. When a measured pressure of the pressure chamber 160 does not reach a preset pressure, the power spring 130 in the spring chamber 150 may not be compressed, and it is detected that the push rod 500 may not return and a drag is notified.

When a foot brake operates, if pressure equal to or greater than a certain level is supplied to the service chamber 310, it is detected that the push rod moves and a normal state is identified; and if pressure less than the certain level is supplied, it is detected that the push rod does not move and the brake does not operate.

Also, when the foot brake does not operate while driving, if pressure is supplied to the service chamber 310, it is determined that a problem occurs in a place where the pressure is supplied such as a check valve, rather than the chamber.

As described above, it is determined whether the brake operates according to whether pressure is greater or less than preset pressure in the pressure chamber 160 and the service chamber 310.

The control box 610 and the wireless communication module may be located inside the push rod chamber 320 or outside the pneumatic spring brake chamber, and the plurality of pressure sensors, the control box 610, and the wireless communication module may be electrically connected to a battery provided in the vehicle to receive power and be driven.

In a pressure sensing system of a pneumatic spring brake chamber for a vehicle according to another embodiment of the present disclosure, to make a structure applicable to a truck and a bus, in a state where the first pressure detection sensor 720 and the second pressure detection sensor 820 are mounted on the control box 610, a separate air pipe connects the first connector 710 and connects the second connector 810. For example, 8 to 12 pressure detection sensors are installed in a trailer, and 6 to 12 pressure detection sensors are installed in a completed vehicle (truck or bus).

The control box 610 includes, in addition to the first and second pressure detection sensors, a wired/wireless communication module, and a device for collecting signals of the first and second pressure detection sensors in real time and transmitting abnormality.

Power is supplied to the control box 610, a parking brake and a service brake are input, and data generated by the operation of the vehicle and the operation of the brake are transmitted to the indicator 620 or the smartphone in real time. Through the first pressure detection sensor, the control box 610 detects whether there is abnormality in a signal value of the pressure detection sensor, a dragging brake due to a reduction in pressure during operation, and parking brake release pressure and transmits a detection result to the indicator. Through the second pressure detection sensor, the control box 610 detects whether there is abnormality such as air leak during brake operation, a dragging brake due to pressure generation during operation, and service brake operating pressure, and transmits a detection result to the indicator.

The above description is merely illustrative of the technical idea of the present disclosure, and one of ordinary skill in the art to which the present disclosure pertains will be able to make various modifications and variations without departing from the essential characteristics of the present disclosure. Accordingly, the embodiments of the present disclosure should be considered in descriptive sense only and not for purposes of limitation of the scope of the present disclosure. The scope of the present disclosure is defined not by the detailed description of the present disclosure but by the appended claims, and all differences within the scope will be construed as being included in the present disclosure.

What is claimed is:

1. A pressure sensing system of a pneumatic spring brake chamber for a vehicle, the pressure sensing system comprising:
   a head housing;
   a bottom housing;
   an adapter housing located between the head housing and the bottom housing;
   a piston located between the head housing and the adapter housing;
   a spring chamber formed between the head housing and the piston;
   a power spring located in the spring chamber;
   a diaphragm fixed between the adapter housing and the bottom housing to divide a space between the adapter housing and the bottom housing;
   a push rod supporting a bottom surface of the diaphragm and moving along a push rod through-hole formed in a bottom surface of the bottom housing;
   a push rod guide fixed to the bottom surface of the bottom housing while sealing between the push rod and the push rod through-hole;
   a plurality of pressure sensors configured to measure pressure in a pressure chamber formed between the piston and the adapter housing;
   a service chamber formed between the adapter housing and the diaphragm;
   a control box electrically connected to the plurality of pressure sensors, the control box wired for power supply and output voltage to the plurality of pressure sensors;
   an indicator electrically coupled to the control box,
   the indicator located in a vehicle driver's seat is configured to generate an alarm about an abnormal situation of the pneumatic spring brake chamber for athe vehicle based on pressure measurement values in the pressure chamber and the service chamber through the plurality of pressure sensors,
   wherein, when external air fills the service chamber, the diaphragm is configured to be expanded, and the push rod is configured to move downward,
   when external air fills the pressure chamber, an air pressure is applied to an entire area of the piston and an edge seal of the piston, and thus the power spring is compressed,
   the control box is configured to determine whether there is abnormality in the spring pressure chamber and the service chamber by using a pressure change from a pressure signal sensed by the plurality of pressure sensors,
   the control box is configured to:
      determine that there is abnormality in the pneumatic spring brake chamber when a sensed stroke value of the push rod is greater or less than a preset reference value, and request to check the pneumatic spring brake chamber; and
      transmit a state of the spring brake chamber to an electronic control unit (ECU) of the vehicle connected to the control box,
   the power spring is configured to be not compressed, and it is detected that the push rod does not return, and a drag is notified,
   when a measured pressure of the pressure chamber does not reach a preset pressure, and
   when a foot brake operates, if pressure equal to or greater than a certain level is supplied to the service chamber, it is detected that the push rod moves and a normal state is identified, and if pressure less than the certain level is supplied, it is detected that the push rod does not move and the brake does not operate.

2. The pressure sensing system of claim 1, wherein each of the plurality of pressure sensors comprises a connector detachably coupled to an outer side of the adapter housing and assembled at a port formed in the service chamber or the pressure chamber, a pressure detection sensor coupled in a communicable state to an internal passage of each connector, and a cover coupled to an outer end in a communication state with each internal passage of each connector.

* * * * *